United States Patent [19]
Tsuji et al.

[11] Patent Number: 5,186,493
[45] Date of Patent: Feb. 16, 1993

[54] ACTUATING MECHANISM FOR SEAT BELT APPARATUS

[75] Inventors: Tetsuo Tsuji; Yoshiichi Fujimura, both of Shiga, Japan

[73] Assignee: Takata Corporation, Tokyo, Japan

[21] Appl. No.: 688,164

[22] Filed: Apr. 19, 1991

[30] Foreign Application Priority Data

Apr. 23, 1990 [JP] Japan ................. 2-108138

[51] Int. Cl.⁵ ............................................. B60R 22/36
[52] U.S. Cl. ................................ 280/806; 242/107.4 A
[58] Field of Search ............... 280/806, 807, 808; 242/107.4 A, 107.4 B, 107.4 R, 107

[56] References Cited

U.S. PATENT DOCUMENTS

| | | | |
|---|---|---|---|
| 4,135,410 | 1/1979 | Filderman | 280/806 |
| 4,424,509 | 1/1984 | Andres et al. | 340/52 E |
| 4,447,017 | 5/1984 | Inukai | 242/107.4 A |
| 4,955,638 | 9/1990 | Kinoshita et al. | 280/806 |
| 5,004,178 | 4/1991 | Kobayashi et al. | 280/806 |

FOREIGN PATENT DOCUMENTS

| | | | |
|---|---|---|---|
| 0442014 | 8/1991 | European Pat. Off. | 280/806 |
| 2227642 | 8/1990 | United Kingdom | |
| 2237180 | 1/1991 | United Kingdom | |

Primary Examiner—Robert P. Olszewski
Assistant Examiner—Kenneth Noland
Attorney, Agent, or Firm—Brumbaugh, Graves, Donohue & Raymond

[57] ABSTRACT

An actuating mechanism for actuating a component of a seat belt apparatus includes a preloaded resiliently biased driving source adapted to a actuate the component upon release of the preload. A trigger normally engages the driving source such as to maintain the preload and is arranged to be displaced by a force imposed on it and thereupon release the driving source. An acceleration sensor releases the trigger from engagement with the driving source by applying the required force to it, the sensor having an inertia body arranged to move along a fixed distance by an inertial force and strike the trigger.

6 Claims, 4 Drawing Sheets

ACTUATING MECHANISM FOR SEAT BELT APPARATUS

BACKGROUND OF THE INVENTION

A seat belt apparatus installed in an automotive vehicle for the purpose of restraining the body of a passenger in a seat is provided with a pretensioner, which is a component of the apparatus actuated in the event of an emergency to tension the belt. Several types of pretensioners are available, such as one which actuates a retractor that is a component of the seat belt apparatus, one which tensions the belt directly, and one which pulls down on a buckle to which the belt is attached. Some pretensioners use an explosive mixture as a driving source for achieving actuation, while others use a spring as the driving source.

In those pretensioners that use an explosive mixture as the driving source, an electrical trigger is required for actuation, and problems arise in terms of high cost and of disposal of the vehicle. Accordingly, various pretensioners have been proposed in which use is made of a spring that can be arranged to operate in a purely mechanical manner.

However, the driving source of a pretensioner must have a sufficient stroke and actuating force. Accordingly, in a case where a spring is adopted as the driving source, using a strong spring requires a large load to set the spring, and a considerable actuating force is necessary to release the spring. In a conventional seat belt apparatus having a static sensor serving as a trigger for actuating a retractor and sensing acceleration in the form of movement of a mass by inertia, it is difficult to reliably actuate a trigger which releases the locked spring.

Accordingly, the mechanism for actuating a pretensioner using a driving source, such as a spring, that needs a large preload requires a trigger actuated by a small force and an acceleration sensor capable of outputting a large mechanical signal.

SUMMARY OF THE INVENTION

The present invention has been proposed in view of the foregoing circumstances and its object is to provide an actuating mechanism which makes it possible to reliably actuate a driving source used in order to actuate a component of a seat belt apparatus by purely mechanical means without intervention of electrical means.

According to the present invention, the foregoing object is attained by an actuating mechanism for actuating a component of a seat belt apparatus having a preloaded resiliently biased driving source adapted to actuate the component upon release of the preload. The invention is characterized in that there is a trigger that is normally in engagement with the driving source such as to maintain the preload in the driving source, in that the trigger is arranged to be displaced by a force imposed on it and thereupon release the driving source, and in that there is an acceleration sensor arranged to release the trigger from engagement with the driving source by applying a force to it, the sensor having an inertia body arranged to move along a fixed distance by an inertial force and strike the trigger.

In a preferred embodiment, the driving source includes an operating portion that is displaceable upon release of the preload such as to actuate the component, and the trigger normally engages the operating portion to restrain it against displacement and maintain the preload. In an advantageous arrangement, the trigger is a toggle link mechanism engaged between a support and the operating portion of the driving source.

In the actuating mechanism for the seat belt apparatus according to the present invention, the a preloaded of the driving source is maintained by the trigger when the mechanism is the non-operating state. When acceleration is sensed, the inertia body of the sensor is moved a fixed distance by an inertial force and strikes the trigger after having accumulated sufficient kinetic energy, thereby releasing the trigger. The preload of the driving source is released by this operation, and the component of the seat belt apparatus is actuated in response to the freeing of the preload.

In the actuating mechanism for the seat belt apparatus according to the present invention, a preloaded driving source is preferably maintained by a toggle link mechanism of the trigger when the mechanism is not operating. When acceleration is sensed, the sensor actuates the toggle link mechanism of the trigger, and the operating portion of the driving source is freed by toggling of the link mechanism, whereby the preload is released. The component of the seat belt apparatus is actuated by freeing of the operating portion of the driving source.

Other features and advantages of the present invention will be apparent from the following description of embodiments taken in conjunction with the accompanying drawings, in which like reference characters designate the same or similar parts throughout the FIGURES thereof.

BRIEF DESCRIPTION OF THE DRAWINGS

FIGS. 1A and 1B schematically illustrate the basic construction of a first embodiment of the present invention, in which FIG. 1A is a side view and FIG. 1B a partial, enlarged view of a portion 1B circled in FIG. 1A;

DESCRIPTION OF THE PREFERRED EMBODIMENTS

Figure 1A:
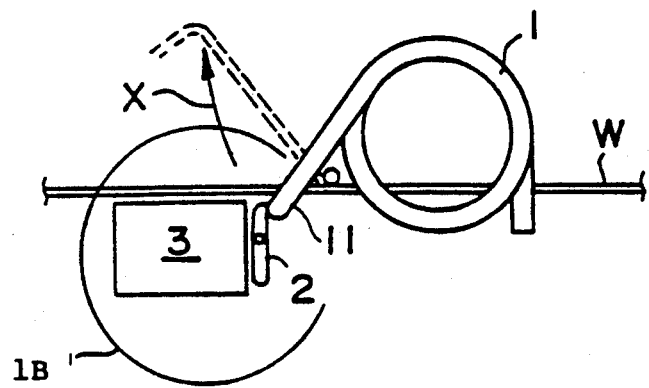
Figure 1B:
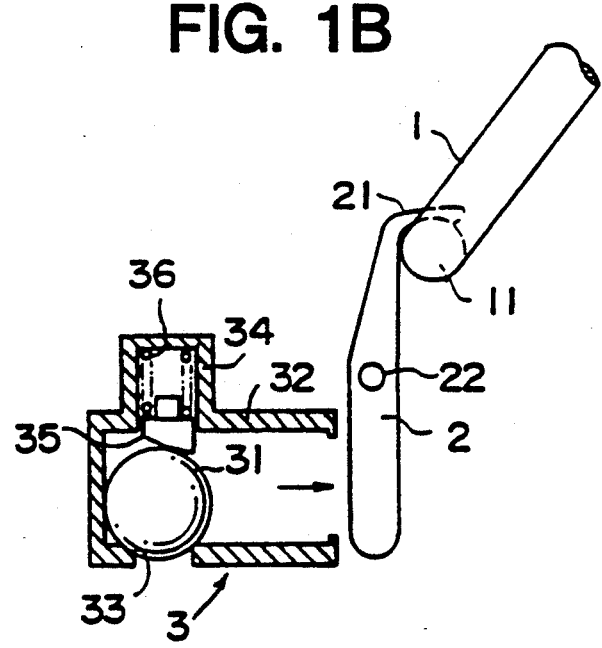

As shown in FIG. 1A, an actuating mechanism for a seat belt apparatus according to the first embodiment is so adapted as to pull a portion of belt W, which is a component of the seat belt apparatus, to one side (such as into a loop) relative to the direction in which the seat belt extends. In the positional relationship illustrated, the seat belt W is pulled upward, as indicated by arrow X. The actuating mechanism is equipped with a pull-up spring 1, which is constituted by a torsion coil spring member, serving as a driving source for tensioning the belt W in response to release of a preload set in advance. The spring 1, the base end of which is secured to a frame (hereinafter referred to as a base) of the seat belt apparatus (not shown), has an operating end 11 situated in close proximity to the belt W. The actuating mechanism is further equipped with a trigger 2 for maintaining and releasing the preload, and sensor means 3 for sensing acceleration and releasing the trigger 2. As shown in FIG. 1(b), the sensor means 3 has a sensor frame 32 and is provided with a spherical inertial body 31, such as a steel ball, which will strike the trigger 2 after having been rolled a fixed distance by an inertial force while being guided by the sensor frame 32.

In this embodiment, the sensor frame 32 has a cylindrical shape and is open at one end. Provided adjacent to the closed end of the sensor frame 32 is a circular hole 33 or recess for holding the spherical inertia body 31 at a prescribed position. The sensor frame also has a spring sleeve 34 at a position opposite the hole 33. A retaining piece 35 is inserted into the spring sleeve 34 and is capable of moving up and down while being guided by the sleeve 34. The retaining piece 35 is pressed against the spherical inertia body 31 by a spring 36, whereby the spherical inertia body 31 is held at the prescribed position of the recess 33. The sensor frame 32 has its open end opposed to the trigger 2 and attached to the aforementioned base, which is not shown.

The trigger 2 has an L-shaped configuration, the approximate mid-portion of the longer leg of which is freely rotatably supported on the base by a shaft 22, and includes a hook 21 extending toward the operating end 11 of pull-up spring 1 for the purpose of engaging this end.

Figure 2:
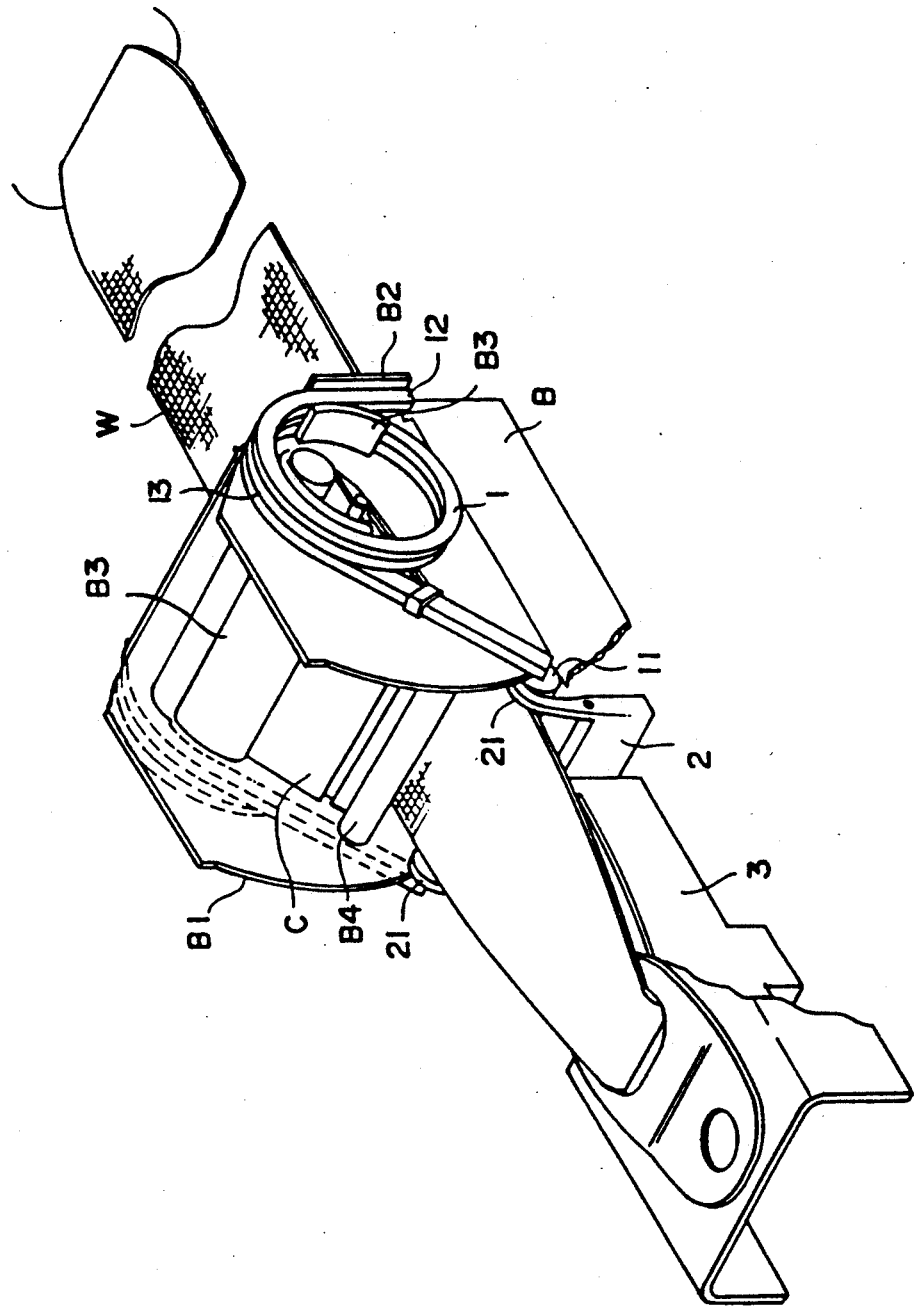
FIG. 2 is a partially cut-away perspective view showing the detailed construction of the first embodiment.

In FIG. 2 the detailed construction of the first embodiment described above is shown. The actuating mechanism is arranged between the belt W, to which a buckle is attached, and the fixed portion of the belt. The basic construction of the actuating mechanism is the same as that of the first embodiment, and portions which are identical are designated by like reference characters and need not be described again.

As shown in FIG. 2, the trigger 2 in this embodiment has hook portions 21 at both of its ends in the transverse direction. The hook portions 21 are engaged with the operating end ii of the pull-up spring 1 between the operating end 11 and both side edges of the belt W. The pull-up spring 1 has coil portions disposed on the outer sides of vertical walls B1 upstanding from a base B on both sides of the belt W. The pull-up spring 1 has on each side a base end 12 abutting against and supported on a bent portion B2 of the vertical wall B1, and a wound coil portion 13 supported on an inner guide B2 attached so as to cross the vertical wall. The operating end 11 of the spring is engaged with the hook portions 21 of hook 2, as described above. The vertical wall B1 is further provided with a guide bar B4 for guiding the bent or looped portion of the belt W when the belt is tensioned. In FIG. 2, reference character C represents a clamp which prevents freeing of a pretensioner biased against the belt W.

In the actuating mechanism of the first embodiment constructed as set forth above, the spherical inertia body 31 of the sensor 3 is stationed in the recess 33 when the mechanism is in the non-operating state, namely when acceleration (deceleration) acting upon the vehicle equipped with the seat belt apparatus has not exceeded a predetermined value. Under these conditions, the preloaded (set) state of the pull-up spring 1 is maintained by the trigger 2. When the acceleration (deceleration) acting upon the vehicle is sensed to exceed the predetermined value, the spherical inertia body 31 of the sensor 3 urges the retaining piece 35 back against the biasing force of spring 36 and rolls toward the open end of the sensor frame 32 owing to the force of inertia. After having accumulated sufficient kinetic energy, the spherical inertia body 31 strikes the trigger 2, thereby turning its arm about the support shaft so that the operating end 11 of the pull-up spring 1 restrained by the hook portion 21 is released. As a result of this operation, the pull-up spring 1 is released from the loaded stated and the belt W of the seat belt apparatus is tensioned in the transverse direction owing to freeing of the set load. When this tensioning operation is carried out, the clamp C is actuated and performs a clamping action to prevent the belt W from being pulled out toward the side of which the buckle is located.

In the actuating mechanism described above, the spherical inertial body 31 of the sensor 3 is stationed in the recess 33 of the sensor frame 32, and hence there is little risk of erroneous operation as caused by vibration of the vehicle body. In addition, by establishing the length of the sensor frame 32 and adjusting its mounting position, the force at which the spherical inertia body 31 impacts against the trigger 2 at the time of actuation can be changed as a matter of design of the device.

Figure 3:
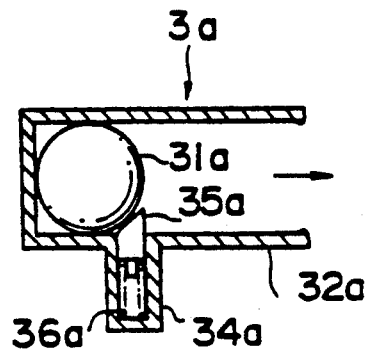
FIG. 3 is a side sectional view showing a modification of a sensor.

FIG. 3 is a sectional view showing a modification of the sensor of this embodiment. In this example, the lower part of a sensor frame 32a is provided with a spring sleeve 34a in which a retaining piece 35a is fitted to load a spring 36a. The sensor frame 35a, spring sleeve 34a, retaining piece 35a and spring 36a constitute a sensor 3a. Adopting this arrangement also makes it possible to perform a function the same as that of the sensor 3 described above.

Figure 4:
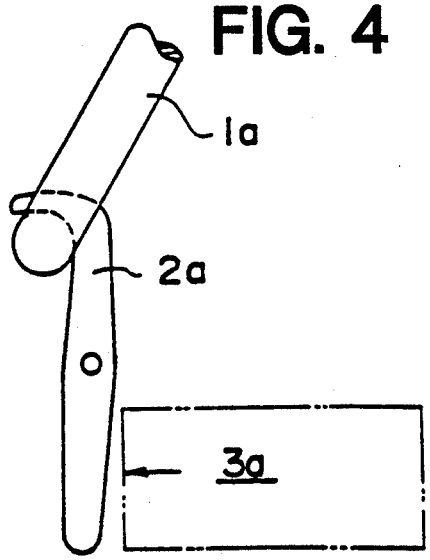
FIG. 4 is a schematic side view showing a modification of a trigger.

FIG. 4 is a schematic side view showing the modification of a trigger in the above-described embodiment. In this example, a trigger 2a is arranged to face a pull-up spring 1a from a direction opposite that in the foregoing embodiment.

Figure 5:
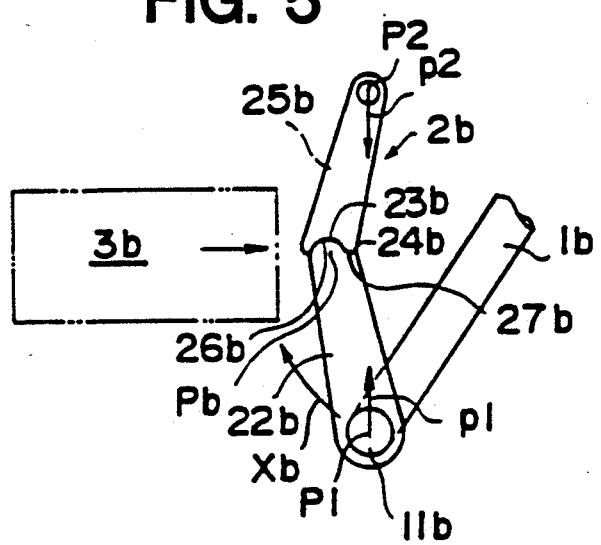
FIG. 5 is a schematic side view showing a second embodiment of the present invention.

FIG. 5 is a schematic side view showing a second embodiment of the present invention. As illustrated in FIG. 5, the actuating mechanism for the seat belt apparatus of the second embodiment is equipped with a pull-up spring 1b having an operating end 11b which actuates the belt in response to freeing of a preload set in advance, a trigger 2b for maintaining the load in the set state by restraining the operating end 11b and for releasing the load from the set state by freeing the operating end from restraint, and a sensor 3b for releasing the trigger 2b. The trigger 2b is constituted by a toggle link mechanism having one end freely rotatably connected to the operating end 11b.

The toggle link mechanism comprises two arms 22b, 25b. The arm 22b has a base end connected to the operating end 11b of the pull-up spring 1b, as described above, and the arm 25b has a base end connected to the operating end 11b of the pull-up spring 1b, as described above, and the arm 25b has a base end freely rotatably supported on a pin protruding from a base, not shown. The arm 22b has a semicircular cylindrical surface 23b formed on its distal end, and planar abutment surface 24, which is contiguous to the cylindrical surface 23b, formed on the side opposite that on which the sensor means is disposed. The arm 25b has a concave cylindrical surface 26b, in sliding contact with the cylindrical surface 23b, formed on its distal end, and a planar abutment surface 27b, which is contiguous to the cylindrical surface 26b, formed on the side opposite that on which the sensor is disposed.

When the actuating mechanism constructed as set forth above is in the non-operating state, the toggle mechanism is acted upon by a force in the direction of arrow Xb in FIG. 5 owing to the preload of the pull-up spring 1b, and loads p1, p2 are received which act in a compressing direction to narrow the spacing between fulcrums p1, p2 constituted by the support pins of the respective arms 22b, 25b. As a result, the arms 22b, 25b attempt to pivot at a fulcrum Pb. However, the two planar abutment surfaces 24b, 27b come into abutting contact with each other so that any further pivotal movement toward the sensor 3b is prevented. Accordingly, the load is maintained in the set state owing to the restraint on the operating end 11b of pull-up spring 1b, this restraint inhibiting rotational motion of the operating end 11b in the direction of arrow Xb.

When acceleration is sensed, the sensor means 3b is actuated so that an impact force of the inertial body serving as a mechanical output acts upon the fulcrum Pb as an impact load. As a consequence, the cylindrical surfaces 23b, 26b slide against each other so that he fulcrum Pb, which is the center of these surfaces, is moved away from the sensor 3b against the set load. When the fulcrum Pb moves beyond a straight line connecting the support fulcrums P1, P2 of the respective arms 22b, 25b, the arms no longer can act to support the loads p1, p2, and therefore the set load of the spring causes the toggle link mechanism to perform a toggling action. As a result, the rotational restraint on the operating end 11b of the pull-up spring 1b in the direction of arrow Xb is freed so that the load is released from the set state, thereby allowing the belt of the seat belt apparatus to be tensioned.

With the toggle link mechanism of the second embodiment, not only is it possible to reduce the starting force of the trigger, but it is also possible to greatly simplify construction.

Figure 6:
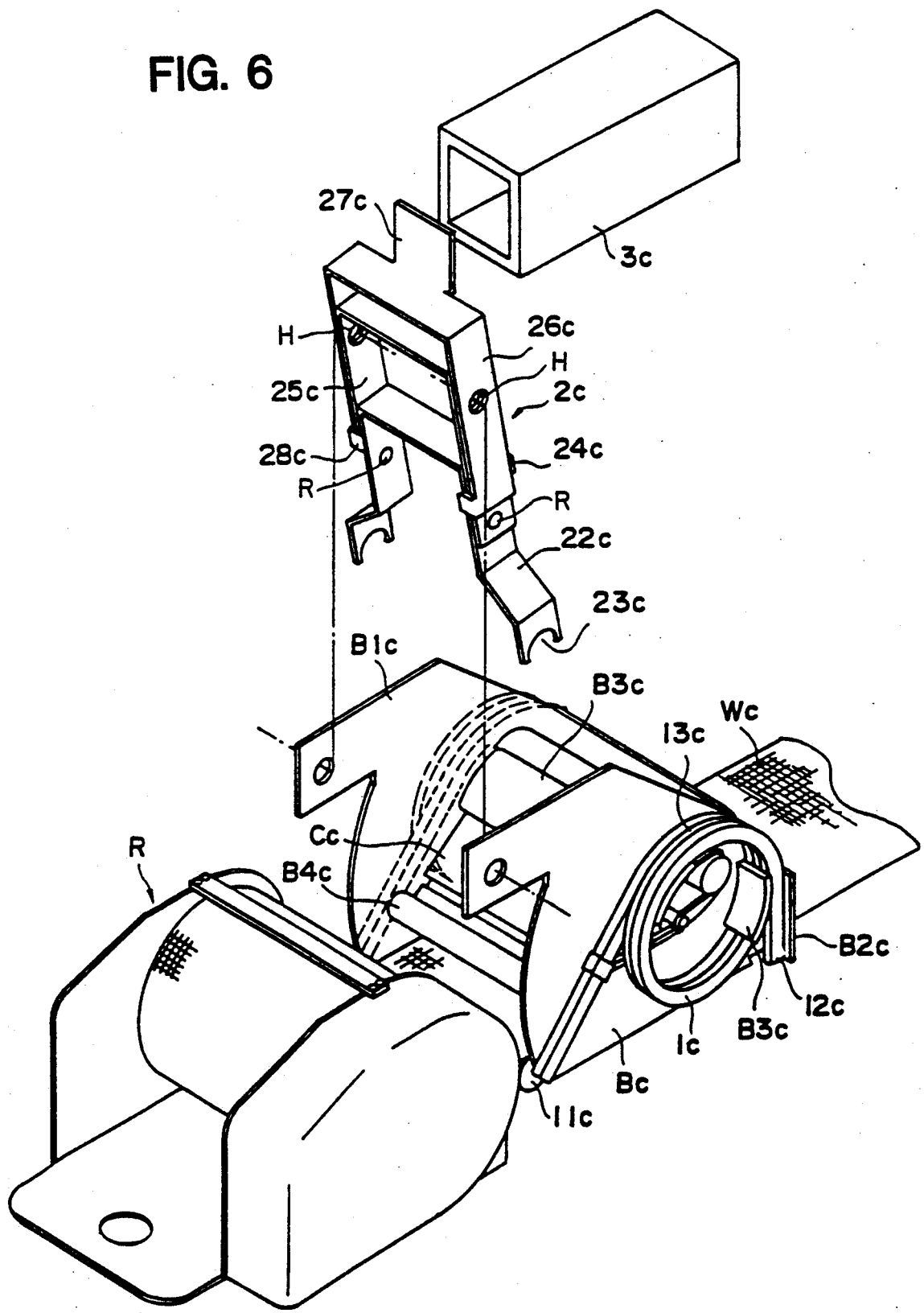
FIG. 6 is an exploded perspective view showing a third embodiment of the present invention.

Finally, FIG. 6 is an exploded perspective view showing a third embodiment of the present invention. In this embodiment, an actuating mechanism similar to that used in the second embodiment described above is arranged in close proximity to a seat belt retractor R. In this embodiment, components equivalent to those of the second embodiment are designated by like reference characters and need not be described again.

This actuating mechanism has a trigger of the second embodiment. In this embodiment, however, the trigger 2c is constituted by a toggle mechanism in which three fork-shaped arms are interconnected. More specifically, the toggle mechanism comprises first and second fork-shaped arms 22d, 25c which are pivoted at their points of connection by rivets or the like R for articulation and a third fork-shaped arm 26c for operating the first and second arms 22c, 25c in a toggling action. The first fork-shaped arm 22c has an arcuate cut-out 23c in each of its distal ends. These cut-outs 23c engage both ends of the operating end 11c of the spring 1C. The base end side of the second fork-shaped arm 25c has holes H at which this arm is freely rotatably by pins (not shown) on vertical walls B1c of a base Bc. The third fork-shaped arm 26c also is freely rotatably supported by pins in the same manner and has an upper end provided with an impact arm 27c which receives an impact force form sensor means 3c. Further, the lower end of the third fork-shaped arm 26c is provided with bent portions 28c which abut against the first and second fork-shaped arms 22c, 25c slightly above their pivot points on the side opposite that on which the pull-up spring is disposed. A bent portion 24c which abuts against the second fork-shaped arm 25c rom the side on which the pull-up spring is disposed is provided near the upper end of the first fork-shaped arm 22c.

In the actuating mechanism thus constructed, the only differences are that the third fork-shaped arm 26c serves to reverse the direction of the impact force from the sensor means 3c, and that the impact force received by the impact surface 27c is transmitted to the bent portions of the first and second fork-shaped arms 22c, 25c via the bent portions 38c. In other aspects the operation of this embodiment is similar to that of the second embodiment described above.

In accordance with the toggle link mechanism of this embodiment, not only can the starting force of the trigger be reduced, but it is also possible to simplify the resetting operation.

Thought the present invention has been described in detail based upon three embodiments, the invention is not limited to these embodiments but can be modified in various ways within the scope of the claims.

In the actuating mechanism of the seat belt apparatus according to the present invention, as described in detail above, a trigger is actuated by collision with an inertia body. As a result, a strong sensor output can be applied mechanically to the trigger by utilizing the kinetic energy accumulated by the inertia body, and therefore it is possible to realize an actuating mechanism which operates in a purely mechanical manner.

In addition, since the trigger can be constructed using a toggle link mechanism, the force needed to actuate the trigger itself can be reduced.

We claim:

1. An actuating mechanism for actuating a component of a seat belt apparatus having a preloaded resiliently biased driving source adapted to actuate the component upon release of the preload characterized in that there is a trigger that is normally in engagement with the driving source such as to maintain the preload in the driving source, in that the trigger is arranged to be displaced by a force imposed on it and thereupon release the driving source, in that there is an acceleration sensor arranged to release the trigger from engagement with the driving source by applying a force to it, the sensor having an inertia body arranged to move along a path through a fixed distance by an initial force and in that the trigger is located in the path of movement of the inertia body and is directly struck by the inertia body after it has moved dynamically through the fixed distance.

2. An actuating mechanism according to claim 1 and further characterized in that the driving source includes an operating portion that is displaceable upon release of the preload such as to actuate the component, and in that the trigger normally engages the operating portion to restrain it against displacement and maintain the preload.

3. An actuating mechanism according to claim 2 and further characterized in that the trigger is a toggle link mechanism engaged between a support and the operating portion of the driving source.

4. An actuating mechanism according to claim 1 and further characterized in that path of movement of the inertia body is defined by a casing, the inertia body being received in the casing.

5. An actuating mechanism according to claim 4 and further characterized in that the inertia body is spherical such that it rolls along the path through the casing.

6. An actuating mechanism according to claim 4 and further characterized in that there is means acting between the casing and the inertia body for restraining the inertia body against movement in the absence of a predetermined acceleration and releasing the inertia body in the event of a predetermined acceleration.

* * * * *